(12) United States Patent
Chen et al.

(10) Patent No.: US 7,641,368 B2
(45) Date of Patent: Jan. 5, 2010

(54) FRONT BEZEL WITH LIGHT DIRECTING DEVICE

(75) Inventors: Yun-Lung Chen, Taipei Hsien (TW); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 163 days.

(21) Appl. No.: 11/778,092

(22) Filed: Jul. 16, 2007

(65) Prior Publication Data

US 2008/0232056 A1    Sep. 25, 2008

(30) Foreign Application Priority Data

Mar. 20, 2007   (CN)   .................... 2007 2 0200162 U

(51) Int. Cl.
    *B60Q 1/08*   (2006.01)
(52) U.S. Cl. .................... 362/384; 362/85; 362/321; 362/277; 361/816
(58) Field of Classification Search ................ 362/384, 362/85, 89, 277, 282, 319, 321, 322, 324; 361/683, 816
    See application file for complete search history.

(56) References Cited

U.S. PATENT DOCUMENTS

| | | | | |
|---|---|---|---|---|
| 5,339,226 A | * | 8/1994 | Ishikawa | ..................... 362/539 |
| 6,824,290 B2 | * | 11/2004 | Noda et al. | .................. 362/155 |
| 6,935,327 B1 | * | 8/2005 | Williams et al. | ........ 126/39 BA |
| 7,207,698 B2 | * | 4/2007 | Kotovsky et al. | ............ 362/321 |
| 2005/0047148 A1 | * | 3/2005 | Gennrich et al. | ............ 362/321 |

FOREIGN PATENT DOCUMENTS

TW           092219937           10/2004

* cited by examiner

*Primary Examiner*—Sandra L O'Shea
*Assistant Examiner*—Evan Dzierzynski
(74) *Attorney, Agent, or Firm*—Frank R. Niranjan

(57) ABSTRACT

A front bezel includes a main body (10) defining a light-pervious area (142) therein, a light-directing member (20) secured to the main body, a shielding plate (30) pivotably secured on the light-directing member, and a gear member (40) rotatably secured on the light-directing member. The light-directing member has a light-directing portion (22) defining a space for securing a light source (60) therein. The space communicates and aligns with the light-pervious area. The light-directing portion defines an installing opening (226) communicating with the space. A plurality of teeth is formed on the shielding plate. The gear member has a plurality teeth (41) meshing with the teeth of the shielding plate, and is rotatable to pivot the shielding plate to cover one portion of the space in which light source is secured, and thereby prevent the light emitting out of the space.

16 Claims, 7 Drawing Sheets

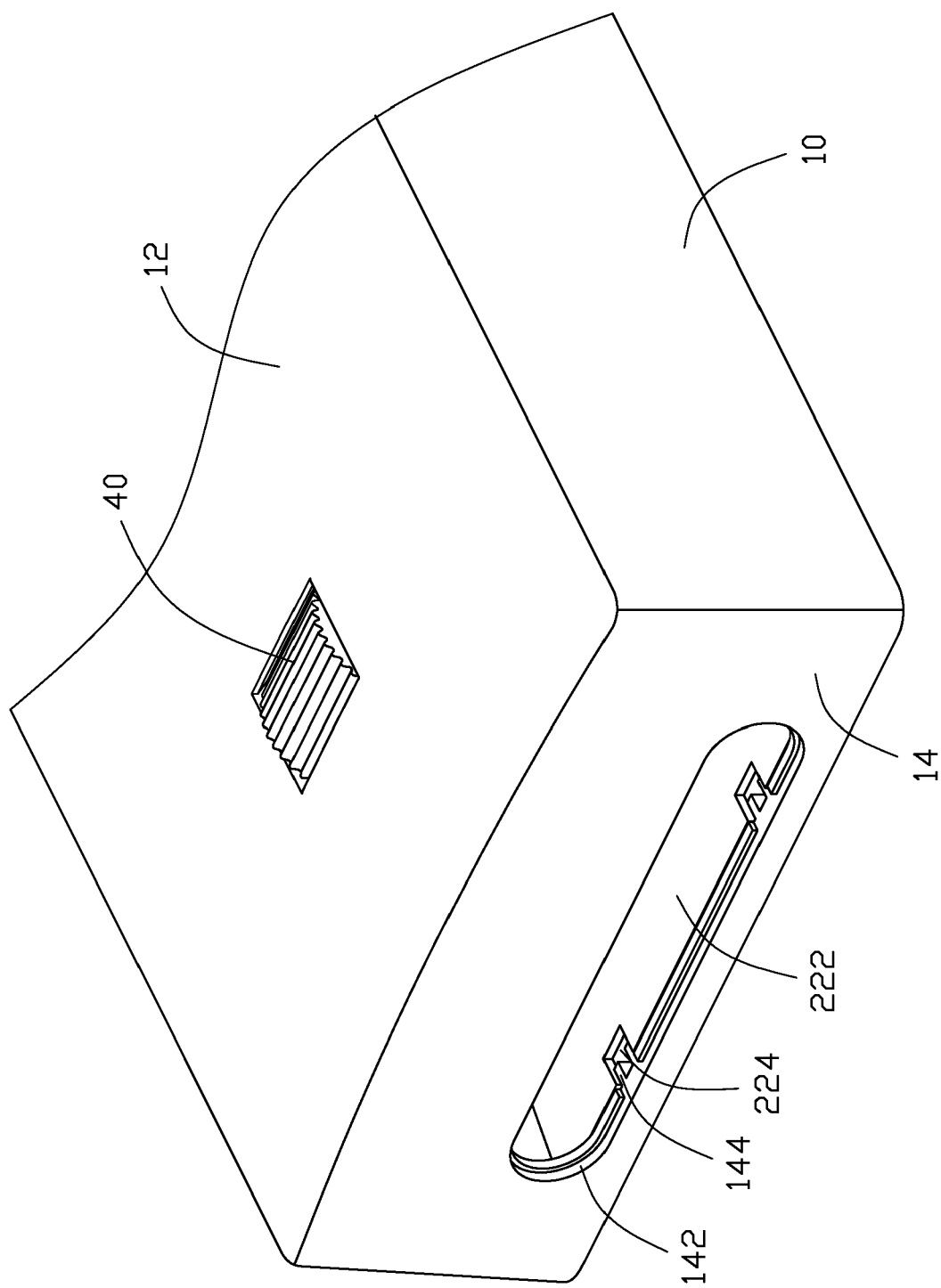

FRONT BEZEL WITH LIGHT DIRECTING DEVICE

BACKGROUND

1. Technical Field

The present invention relates to front bezels of computers, and more particularly to a front bezel of a computer with a light-directing device.

2. General Background

A light source is usually secured on a front bezel of a computer. A light-directing member is secured on the front bezel for focusing light generated from the light source on a predetermined portion of the front bezel, thereby illuminating the front bezel when the computer is on. Conventionally, the light source turns on when the computer is turned on. Thus, the light of the light source cannot be turned off when the computer is in use, even if it is so desired.

What is needed, therefore, is a front bezel of a computer which is capable of shielding light generated from a light source when the computer is on.

SUMMARY

A front bezel includes a main body defining a light-pervious area therein, a light-directing member secured to an inner surface of the main body, a shielding plate pivotably secured on the light-directing member, and a gear member rotatably secured on the light-directing member. The light-directing member has a light-directing portion defining a space for securing a light source therein. The space communicates and aligns with the light-pervious area of the main body. The light-directing portion defines an installing opening communicating with the space. The shielding plate extends into the space of the light-directing portion via the installing opening. A plurality of teeth is formed on the shielding plate. The gear member has a plurality teeth meshing with the teeth of the shielding plate, and is rotatable to pivot the shielding plate from one position where the shielding plate covers one portion of the space in which the light source is secured, and thereby prevents light of the light source emitting out of the space, to another position wherein the shielding plate exposes the portion of the space in which the light source is secured to thereby allow the light of the light source to emit out of the space.

Other advantages and novel features will be drawn from the following detailed description of preferred embodiments with attached drawings, in which:

BRIEF DESCRIPTION OF THE DRAWINGS

FIG. 7 is similar to FIG. 6, but viewed from another aspect.

DETAILED DESCRIPTION OF PREFERRED EMBODIMENTS

Figure 1:
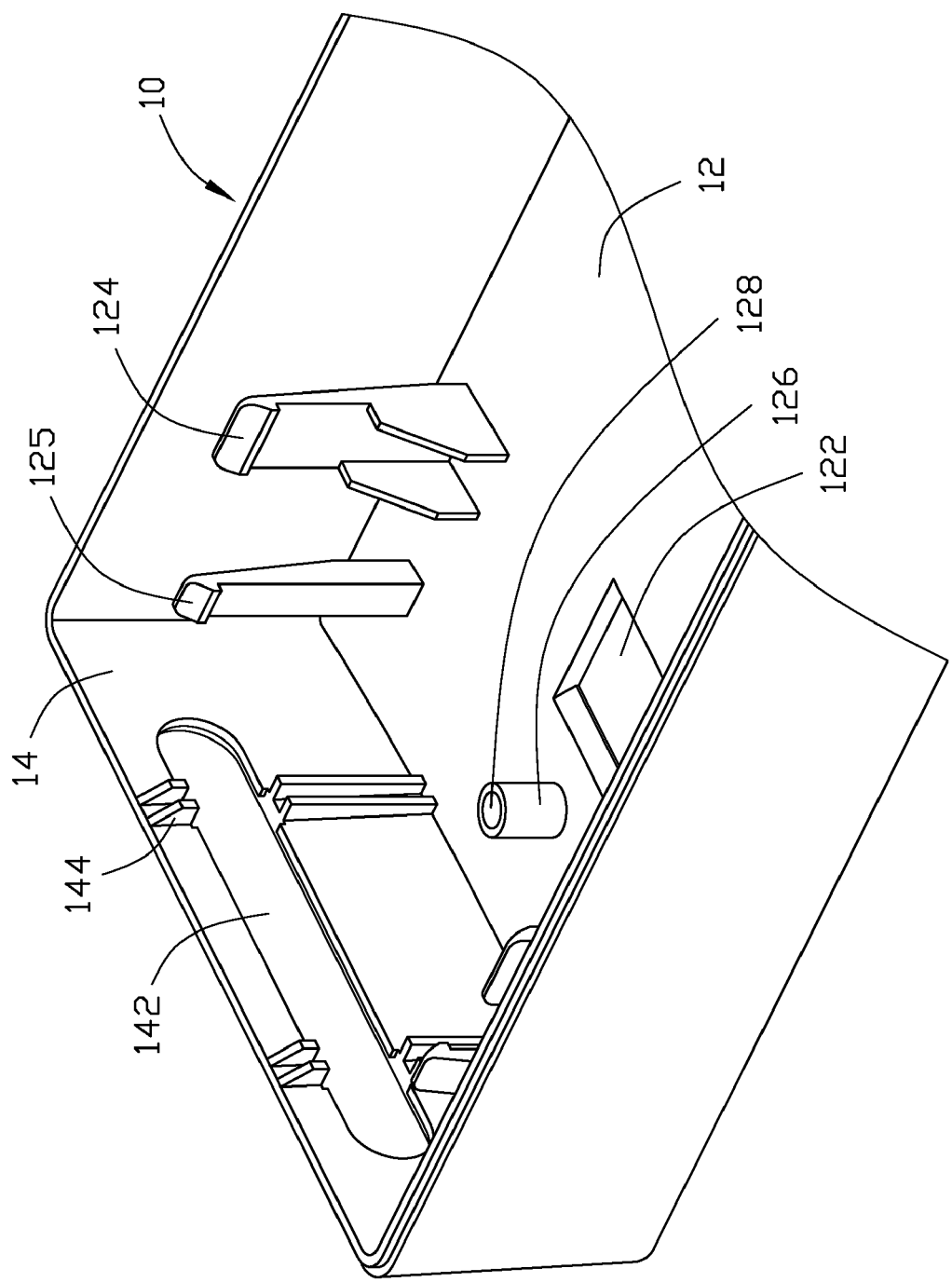
FIG. 1 is an isometric partial view of a main body of a front bezel in accordance with a preferred embodiment of the present invention.
Figure 2:
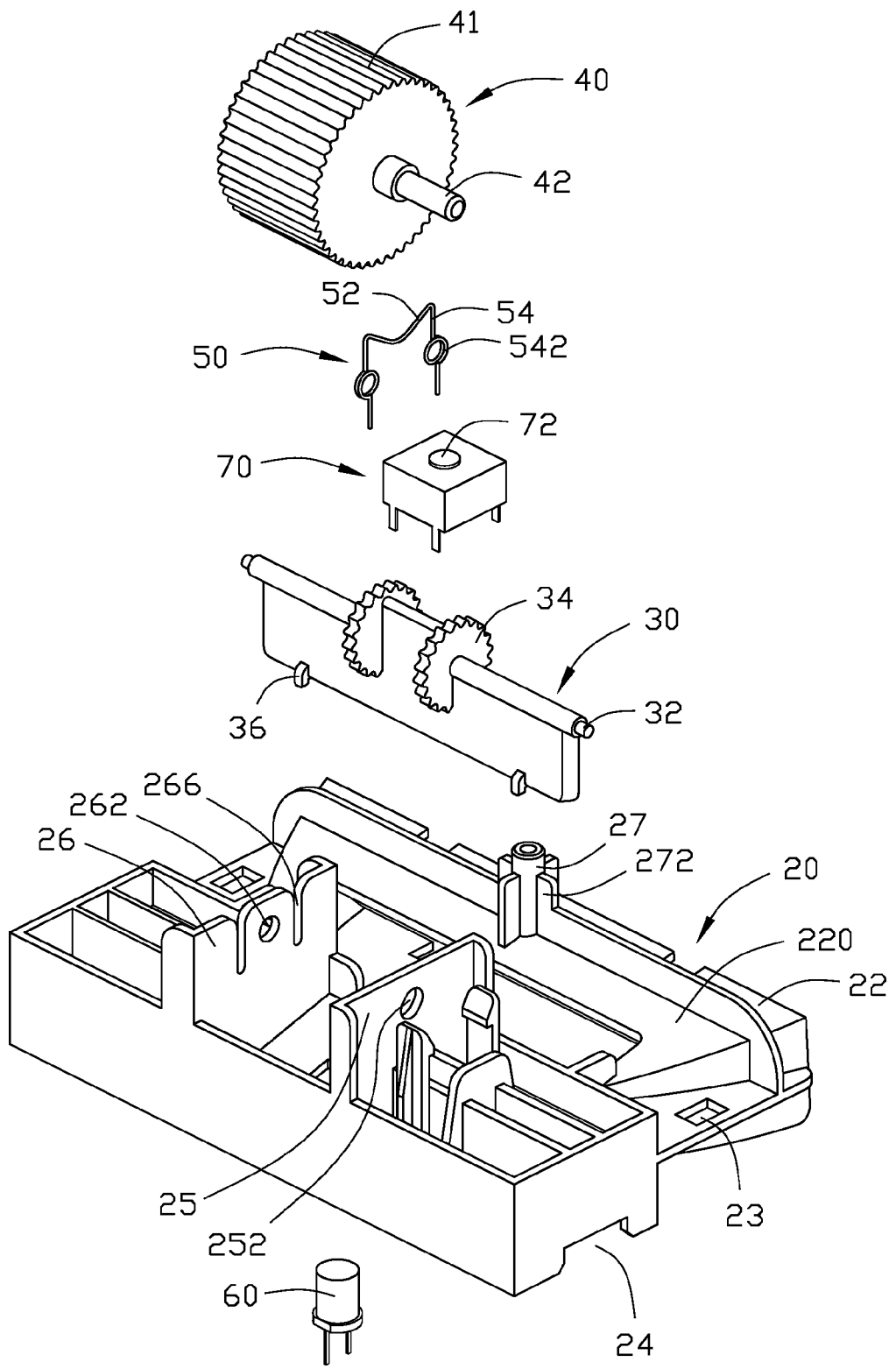
FIG. 2 is an exploded, isometric view of a switch, a light source, and a light-directing device of a front bezel in accordance with the preferred embodiment of the present invention, the light-directing device including a light-directing member, a shielding plate, a resilient member, and a gear member.

Referring to FIGS. 1 and 2, a front bezel of a computer in accordance with an embodiment of the present invention includes a main body 10, a light-directing device (not labeled), a light source, such as an LED (light-emitting diode) 60, and a switch 70 for controlling power to the computer. The light-directing device includes a light-directing member 20, a shielding plate 30, a gear member 40, and a resilient member 50.

The main body 10 includes a first plate 12, and a second plate 14 generally perpendicular to the first plate 12. A through opening 122 is defined in the middle of the first plate 12 adjacent the second plate 14. A post 126 with a mounting hole 128 defined therein protrudes perpendicularly from an inner surface of the first plate 12 between the second plate 14 and the through opening 122. A pair of first hooks 124 protrudes perpendicularly from the inner surface of the first plate 12 respectively adjacent opposite edges thereof, and a pair of second hooks 125 respectively adjacent the pair of first hooks 124 also protrudes perpendicularly from the inner surface of the first plate 12. A light-pervious area 142 is defined in the second plate 14. Two guideways 144 are formed perpendicularly from an inner surface of the second plate 14, and follow a path perpendicular to the first plate 12, extending from the first plate 12 to the top edge of the second plate 14 except where the path crosses the light-pervious area 142.

Figure 3:
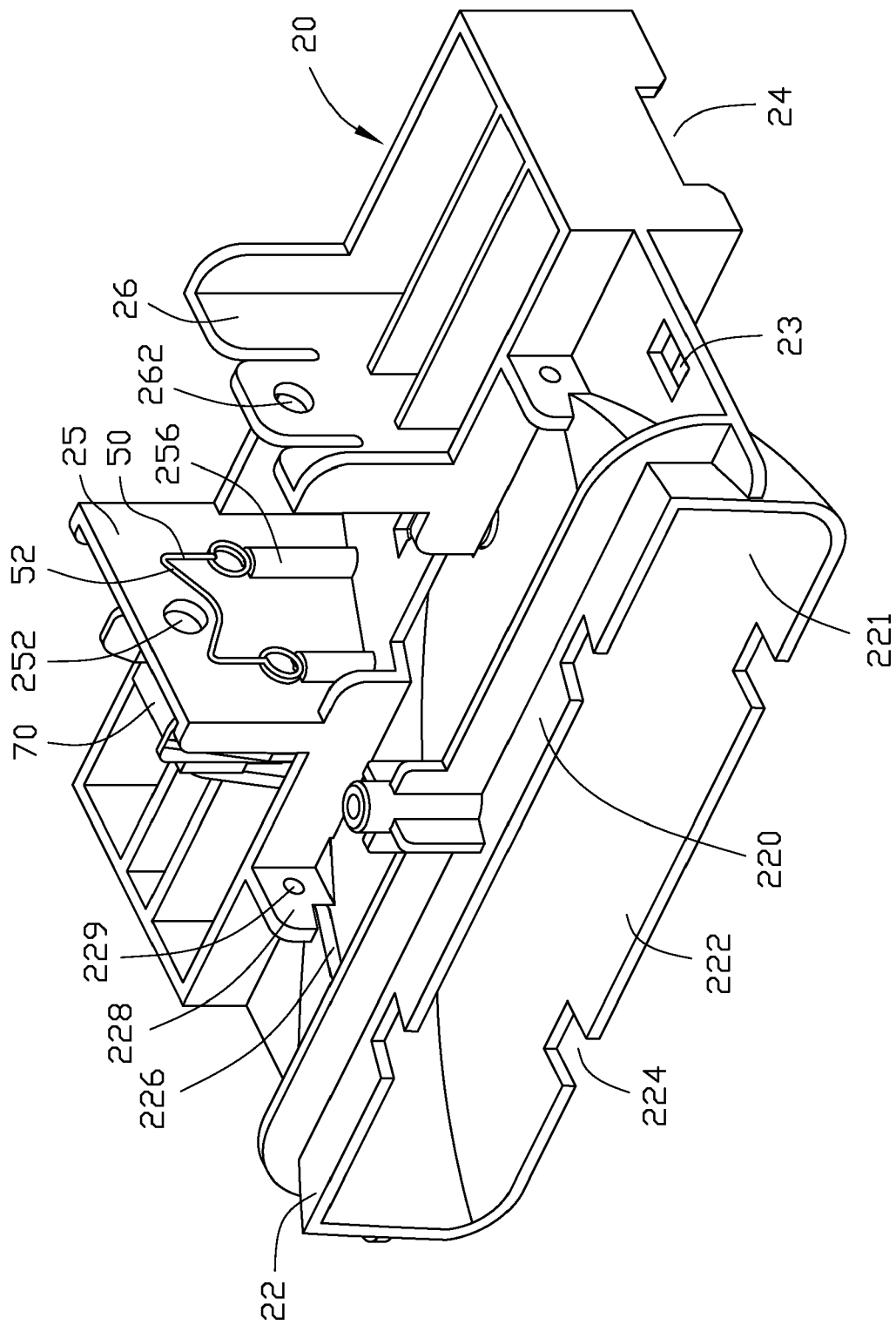
FIG. 3 is an assembled view of the light-directing member, the resilient member, and the switch of FIG. 2.

Referring to FIG. 3, the light-directing member 20 has a light-directing portion 22 defining a space therein. The light-directing portion 22 has an aperture 222 at a front end thereof, communicating the space to outside of the light-directing member 20. Two cutouts 224 are defined in a top wall 220 and a bottom wall 221 of the light-directing portion 22 adjacent the aperture 222, for receiving the guideways 144 of the main body 10 therein. An installing opening 226 is defined in the top wall 220 of the light-directing portion 22 at a rear end portion thereof, communicating with the space of the light-directing portion 22. Two securing blocks 228 each with a pivot hole 229 defined therein are formed on the top surface of the top wall 220 of the light-directing portion 22 at opposite edges of the installing opening 226. Two blocking holes 227 (shown in FIG. 6) are defined in the bottom wall 221 of the light-directing portion 22 under the installing opening 226. Two parallel walls 25, 26 are formed on the light-directing member 20 behind the light-directing portion 22. Each of the walls 25, 26 defines a pivot hole 252, 262 therein, respectively. The pivot hole 252 is elliptic, and has a major axis generally perpendicular to a top edge of the wall 25. The pivot hole 262 is circular. Two posts 256 (shown in FIG. 3) each with a securing hole defined therein protrude from a surface of the wall 25, facing the wall 26. Two cutouts 266 are defined in the wall 26 at two sides of pivot hole 262, for conveniently deforming a portion of the wall 26 between the cutouts 266. Two locking holes 23 are defined in the light-directing member 20 at two sides of the light-directing portion 22, and two locking cutouts 24 are defined nearby the locking holes 23 respectively. A positioning post 27 with a plurality of ribs 272 formed on outer surface thereof is formed on the top surface of the top wall 220 of the light-directing portion 22 at a front edge of the installing opening 226.

Referring to FIG. 2, the shielding plate 30 is shaped for covering the installing opening 226 of the light-directing portion 22 of the light-directing member 20, and has a shaft 32 formed on a top edge thereof. Two parallel gear portions 34 each with a plurality of teeth formed thereon are formed on the shielding plate 30, and perpendicular to the shaft 32. Two blocking tabs 36 protrude from a bottom edge of the shielding plate 30, corresponding to the blocking holes 227 of the light-directing portion 22 of the light-directing member 20.

The gear member 40 is cylindrical, and includes a plurality of teeth 41 formed thereon for meshing with the teeth 32 of the shielding plate 30. Two pivot posts 42, 44 are respectively formed on end surfaces of the gear member 40. Each of the pivot posts 42, 44 includes a thick portion and a thin portion having a smaller diameter than the thick portion. The thin portion of the pivot post 42 has a greater length than the thin portion of the pivot post 44.

The resilient member 50 includes a V-shaped portion 52 and two inserting feet 54 bent from the V-shaped portion 52. A ring 542 is formed on each of the inserting feet 54.

Figure 4:
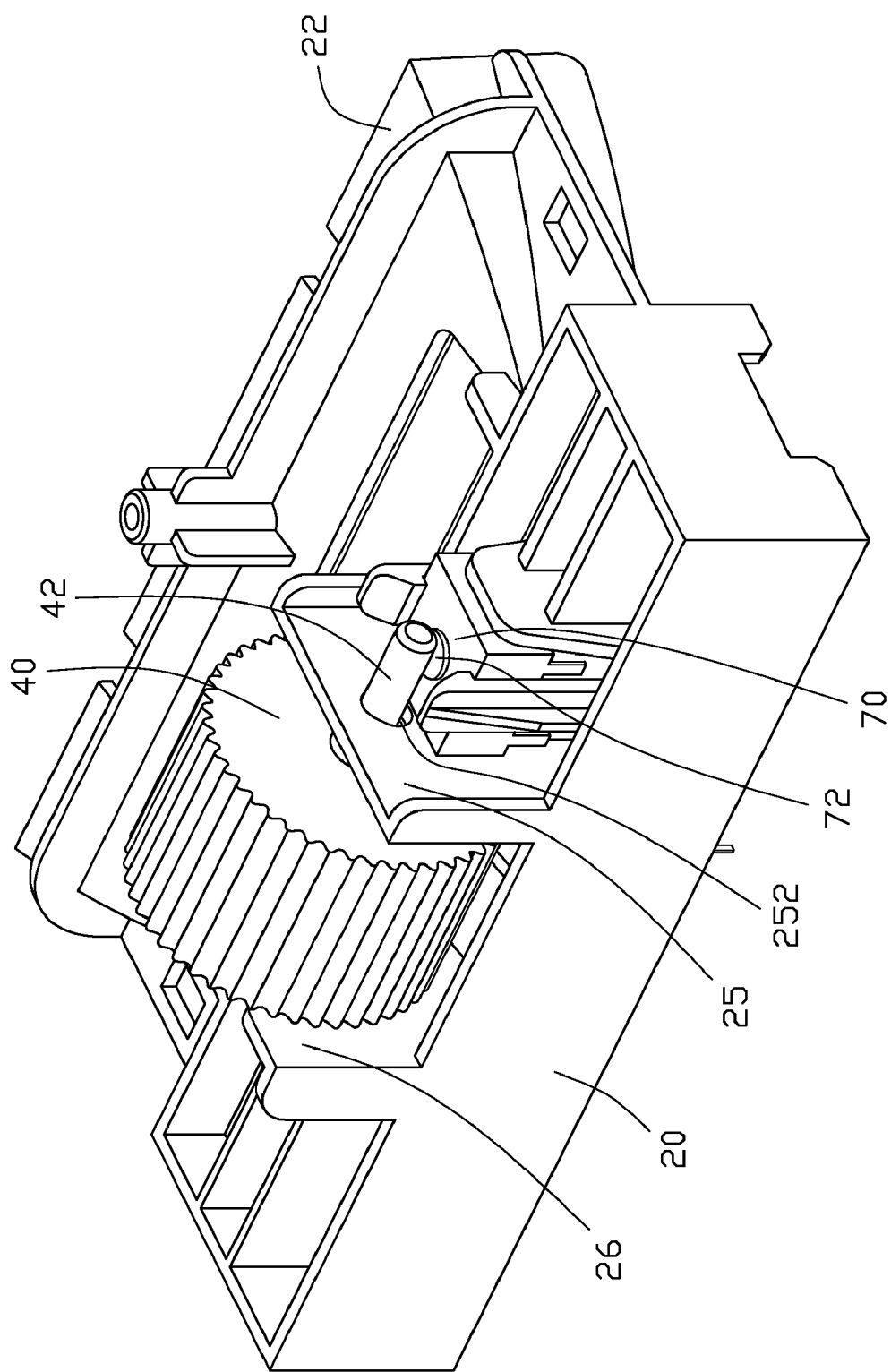
FIG. 4 is similar to FIG. 3, but viewed from another aspect.
Figure 5:
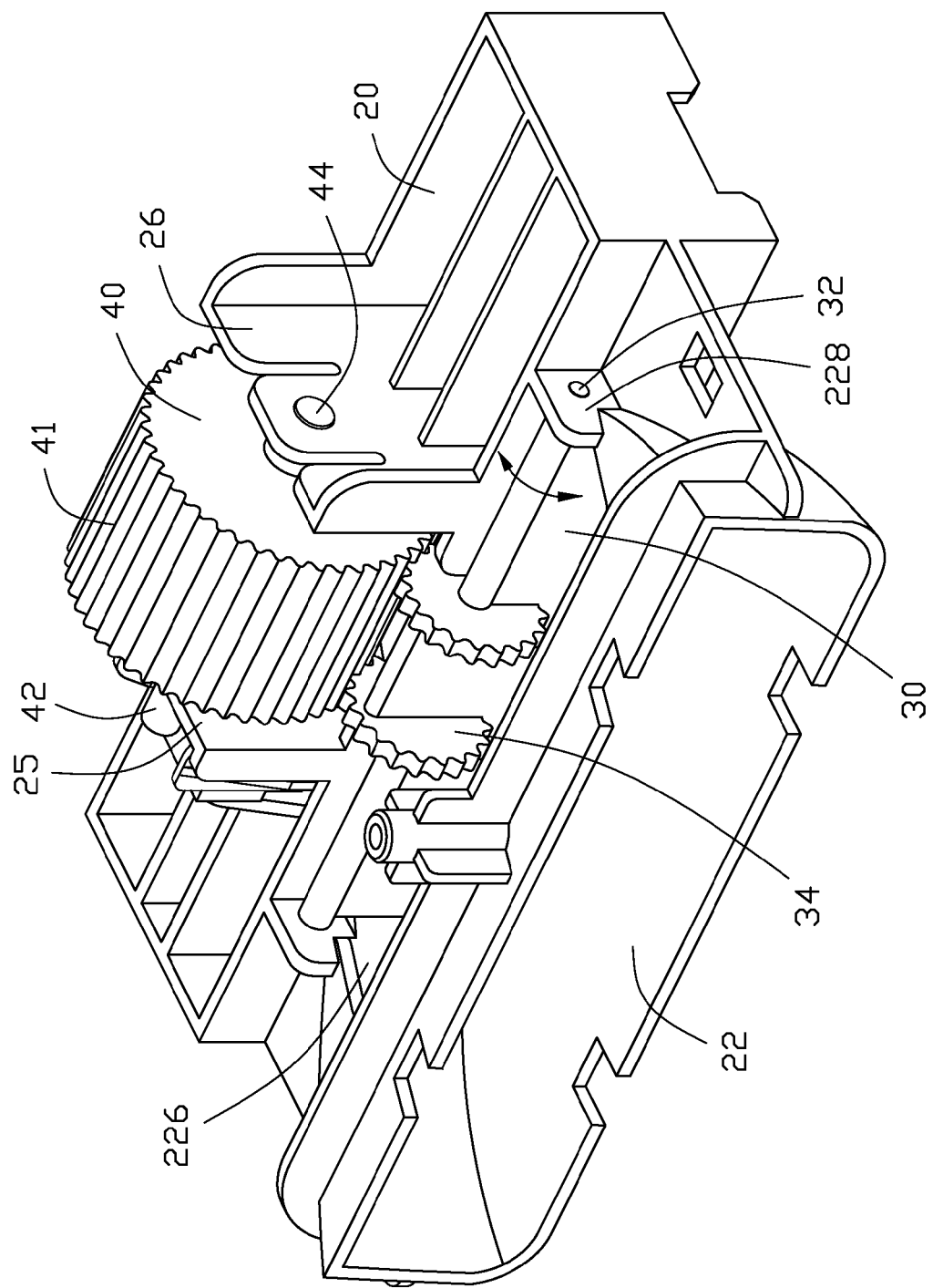
FIG. 5 is an assembled view of FIG. 2, shown from another aspect.

Referring also to FIGS. 4 and 5, the inserting feet 54 are respectively inserted into the securing holes of the posts 256 of the wall 25 of the light-directing member 20. The rings 542 are positioned on top ends of the posts 256. The V-shaped portion 52 of the resilient member 50 is positioned beneath the pivot hole 252 of the wall 25. The switch 70 is secured on the light-directing member 20 on a side of the wall 25 opposite to the resilient member 50.

The shaft 32 of the shielding plate 30 is pivotably received into the pivot holes 229 of the securing blocks 228 of the light-directing portion 22 of the light-directing member 20. The shielding plate 30 is inserted into the space of the light-directing portion 22 via the installing opening 226. The gear member 40 is located between the walls 25, 26. The thin portion of pivot post 42 is inserted into the pivot hole 252 of the wall 25 to abut on a button 72 of the switch 70, and the thick portion of the pivot post 42 abuts on the V-shaped portion 52 of the resilient member 50. The thin portion of the pivot post 44 of the gear member 40 is inserted into the pivot hole 262 of the wall 26. The teeth 41 of the gear member 40 mesh with the teeth of the gear portions 34 of the shielding plate 30, so that the shielding plate 30 is capable of rotating around the shaft 32 when the gear member 40 is rotated.

Figure 6:
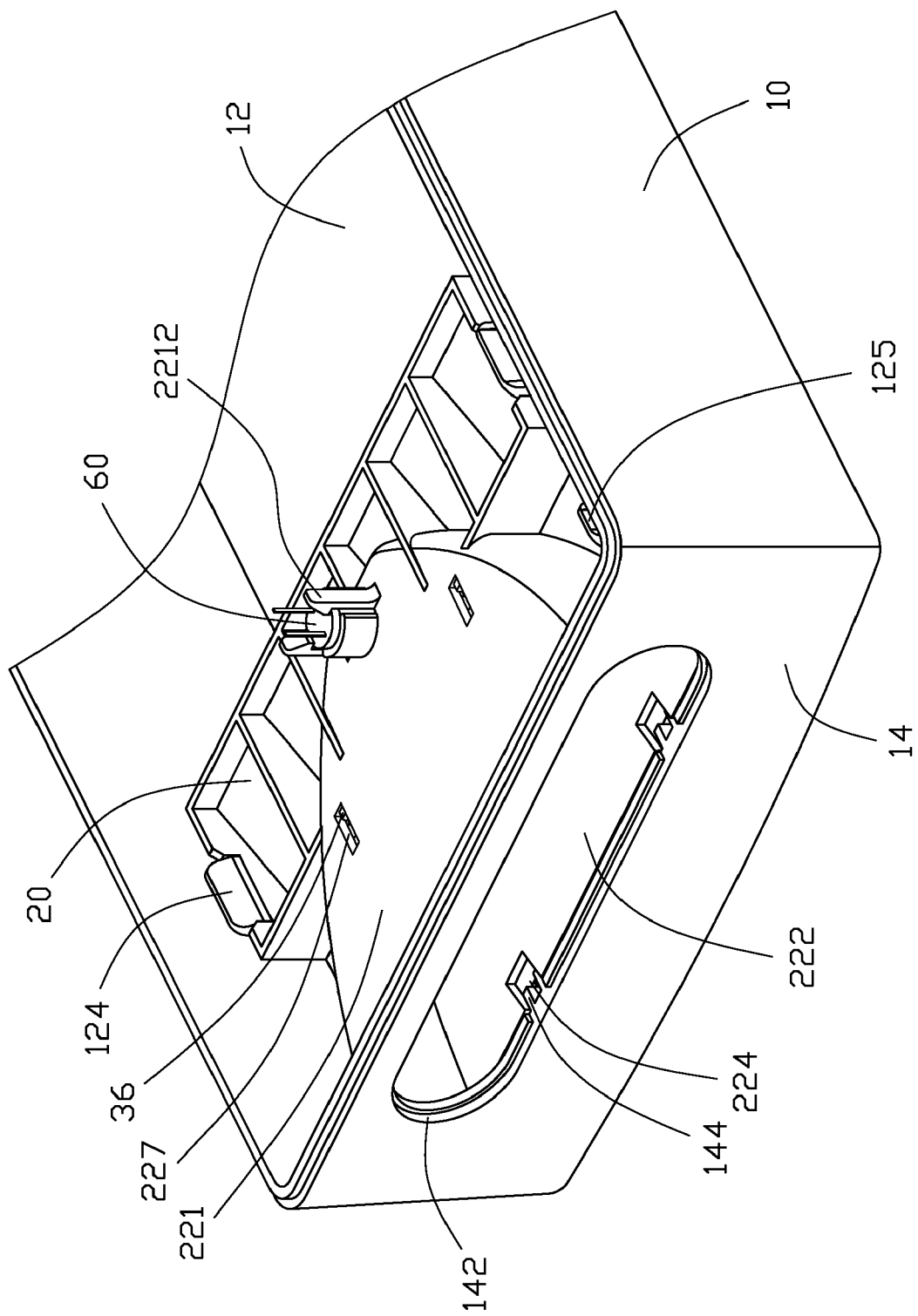
FIG. 6 is an assembled view of the switch, the light source, and the light-directing device of FIG. 2 installed in the front bezel of FIG. 1.

Referring also to FIGS. 6 and 7, in assembly, the positioning post 27 of the light-directing member 20 is inserted into the mounting hole 128 of the post 126 of the main body 10, thereby securing the gear member 40 between the walls 25, 26. The cutouts 224 of the light-directing member 20 receive the corresponding guideways 144 of the second plate 14 of the main body 10 therein. The light-directing member 20 is pressed until the ribs 272 seat on the distal end of the post 126 and the first and second hooks 124, 125 are respectively engaged into the locking holes 23 and the locking cutouts 24 of the light-directing member 20. The gear member 40 is exposed out of the main body 10 via the through opening 122 of the first plate 12 of the main body 10. The aperture 222 of the light-directing portion 22 of the light-directing member 20 aligns with the light-pervious area 142 of the second plate 14 of the main body 10. The light-directing member 20 is thus secured on the main body 10.

The LED 60 is secured in a through hole (not labeled) defined in the bottom wall 221 of the light-directing portion 22 of the light-directing member 20 with two hooks 2212 located at opposite side thereof (shown in FIG. 6). In use, light generated from the LED 60 emits to outside of the main body 10 from the light-pervious area 142 of the second plate 14 of the main body 10 via the light-directing portion 22. At this time, the shielding plate 30 is positioned in a first position (which does not shield the light of the LED 60), in which the shielding plate 30 is positioned in the installing opening 226 of the light-directing portion 22 and the blocking tabs 36 thereof abut on an inner surface of the top wall 220 of the light-directing portion 22. When it is desired to shield the light of the LED 60, the gear member 40 is rotated in a first direction from outside of the main body 10, thereby urging the shielding plate 30 to rotate in the space of the light-directing portion 22 until the shielding plate 30 is positioned in a second position, which shields the light of the LED 60 within the space and not be capable of emitting to outside of the main body 10 from the light-pervious area 142. The shielding plate 30 positioned in the first position is generally perpendicular to the shielding plate 30 positioned in the second position. At this time, the blocking tabs 36 of the shielding plate 30 are engaged in the corresponding blocking holes 227 of the light-directing portion 22. When it is desired to allow the light of the LED 60 to emit from of the main body 10, the gear member 40 is rotated in reverse to the first direction to thereby rotate the shielding plate 30 from the second position to the first position, thereby allowing the light of the LED 60 transmitting through the light-pervious area 142.

In this embodiment, the gear member 40 is also used as a button to control the switch 70 to turn on/off power to the computer. When the gear member 40 is pressed in, the thin portion of the pivot post 42 presses the button 72 of the switch 70, thus activating the switch 70. At the same time, the thick portion of the pivot post 42 presses the V-shaped portion 52 of the resilient member 50 to resiliently deform. When the gear member 40 is released, the V-shaped portion 52 of the resilient member 50 rebounds to an original state to push the thin portion of the pivot post 42 to an original position. The same procedure is used whether turning on or turning off power to the computer.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A front bezel, comprising:
   a main body defining a light-pervious area therein;
   a light-directing member secured to an inner surface of the main body, the light-directing member having a light-directing portion defining a space for securing a light source therein, the space communicating and aligning with the light-pervious area of the main body, the light-directing portion defining an installing opening communicating with the space;
   a shielding plate pivotably secured on the light-directing member and extending into the space of the light-directing portion via the installing opening, a plurality of teeth being formed on the shielding plate; and
   a gear member rotatably secured on the light-directing member, and having a plurality teeth meshing with the teeth of the shielding plate, the gear member being rotatable to pivot the shielding plate from one position where the shielding plate covers one portion of the space in which the light source is secured, and thereby prevents light of the light source emitting out of the space, to another position wherein the shielding plate exposes the portion of the space in which the light source is secured to thereby allow the light of the light source to emit out of the space;

wherein two parallel walls are formed on the light-directing portion for the gear member being rotatably secured therebetween, each of the walls defining a pivot hole therein, the gear member having two pivot posts rotatably received in the corresponding pivot holes of the walls.

2. The front bezel as described in claim 1, wherein the main body comprises a first plate and a second plate generally perpendicular to the first plate, the light-pervious area defined in the second plate, a guideway protruding from an inner surface of the second plate across the light-pervious area, the light-directing portion of the light-directing member defining a cutout receiving the guideway of the main body therein.

3. The front bezel as described in claim 2, wherein a plurality of hooks protruding an inner surface of the first plate of the main body, the light-directing member defining a plurality of locking holes therein engaging with the corresponding hooks.

4. The front bezel as described in claim 3, wherein a post with a mounting hole defined therein protrudes from the inner surface of the first plate of the main body, a post protruding from the light-directing portion of the light-directing member engaging in the mounting hole of the post of the main body.

5. The front bezel as described in claim 3, wherein the first plate of the main body defines a through opening therein, the gear member exposed out of the main body via the through opening.

6. The front bezel as described in claim 1, wherein the pivot hole of one of the walls is elliptic, and one of the pivot posts of the gear member comprises a thin portion secured into the elliptic pivot hole and a thick portion positioned at a side of one of the walls.

7. The front bezel as described in claim 6, wherein a switch with a button is secured on the light-directing member at the other side of the one of the walls, the thin portion of the pivot post of the gear member extending through the elliptic pivot hole to abut on the button of the switch.

8. The front bezel as described in claim 6, wherein the other wall defines two cutouts at two sides of the corresponding pivot hole for facilitating deformation of one portion thereof, in which the corresponding pivot hole is defined when the gear member is secured to the walls.

9. The front bezel as described in claim 6, wherein a resiliently member is secured on the side of the wall beneath the elliptic hole, and resiliently deformed when the gear member is pressed from outside the main body.

10. The front bezel as described in claim 9, wherein the resilient member comprises a V-shaped portion engaging with the corresponding pivot post of the gear member, and two inserting feet bent from the V-shaped portion and secured on one of the walls.

11. A light-directing device, comprising:
a light-directing member comprising a light-directing portion defining a space for a light source secured therein;
a shielding plate rotatably secured on the light-directing member, the shielding plate having a gear portion with a plurality of teeth formed thereon; and
a gear member rotatably secured on the light-directing member, and having a plurality teeth meshing with the gear portion of the shielding plate, wherein the shielding plate is rotatable relative to the light-directing portion between a first position where the light source is shielded in the space of the light-directing portion and a second position where the light source is exposed to an exterior of the light-directing portion;
wherein two parallel walls are formed on the light-directing portion with the gear member rotatably secured therebetween, each of the walls defining a pivot hole therein, the gear member having two pivot posts rotatably received in the corresponding pivot holes of the walls.

12. The light-directing device as described in claim 11, wherein the pivot hole of one of the walls is elliptic, and one of the pivot posts of the gear member comprises a thin portion secured into the elliptic pivot hole and a thick portion positioned at a side of the one of the walls.

13. The light-directing device as described in claim 12, wherein a switch with a button is secured on the light-directing member at the other side the one of the walls, the thin portion of the pivot post of the gear member extending through the elliptic pivot hole to abut on the button of the switch.

14. The light-directing device as described in claim 12, wherein the other one of the walls defines two cutouts at two sides of the corresponding pivot hole for facilitating mounting of the gear member between the walls.

15. The light-directing device as described in claim 12, wherein a resiliently member is secured on the side of the one of the walls beneath the elliptic hole, and resiliently deformed when the gear member is pressed.

16. The light-directing device as described in claim 15, wherein the resilient member comprises a V-shaped portion engaging with the corresponding pivot post of the gear member, and two inserting feet bent from the V-shaped portion and secured on the one of the walls.

* * * * *